United States Patent [19]
Schorr et al.

[11] 3,920,640
[45] Nov. 18, 1975

[54] ACYLAMINO-CEPHEM-CARBOXYLIC ACIDS AND PROCESS FOR PREPARING THEM

[75] Inventors: Manfred Schorr, Frankfurt am Main; Manfred Worm, Mainz; Elmar Schrinner, Wiesbaden, all of Germany

[73] Assignee: Hoechst Aktiengesellschaft, Frankfurt am Main, Germany

[22] Filed: May 2, 1973

[21] Appl. No.: 356,466

[30] Foreign Application Priority Data
May 5, 1972 Germany............................ 2222140
Apr. 3, 1973 Germany............................ 2316541

[52] U.S. Cl............................ 260/243 C; 424/246
[51] Int. Cl.²...................................... C07D 501/24
[58] Field of Search.............................. 260/243 C

[56] References Cited
UNITED STATES PATENTS
3,749,711   7/1973   Schorr et al...................... 260/239.1

Primary Examiner—Nicholas S. Rizzo
Attorney, Agent, or Firm—Curtis, Morris & Safford, P.C.

[57] ABSTRACT

Acylamino-cephem-carboxylic acids of the general formula

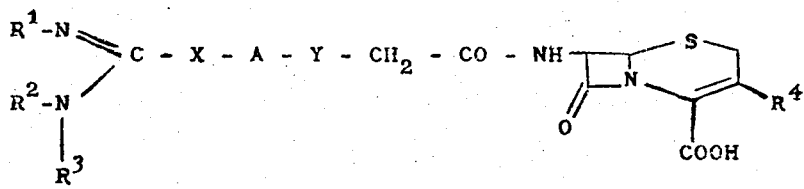

in which $R^1$, $R^2$ and $R^3$ represent hydrogen or lower alkyl groups and $R^1$ and $R^2$ may form together an alkylene group which may be substituted, $R^4$ represents a linear or branched alkyl radical of 1 to 5 carbon atoms, a cyclo-alkyl radical of 3 to 7 carbon atoms which may be interrupted by heteroatoms, X represents a single bond or NH, A represents a phenylene or thienylene group which may be substituted and Y represents a single bond or oxygen, and their physiologically tolerated salts; the novel compounds have very good anti-bacterial properties.

19 Claims, No Drawings

ACYLAMINO-CEPHEM-CARBOXYLIC ACIDS AND PROCESS FOR PREPARING THEM

The present invention relates to acylamino-cephem-carboxylic acids of the general formula I

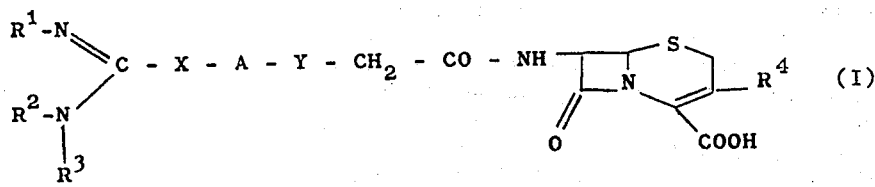

in which $R^1$, $R^2$ and $R^3$ represent hydrogen or lower alkyl groups and $R^1$ and $R^2$ may form together an alkylene group which may be substituted, $R^4$ represents a linear or branched alkyl radical of 1 to 5 carbon atoms, a cyclo-alkyl radical of 3 to 7 carbon atoms which may be interrupted by hetero-atoms, X represents a single bond or NH, A represents a phenylene or thienylene group which may be substituted and Y represents a single bond or oxygen, and to their physiologically tolerated salts.

The invention furthermore relates to a process for the preparation of the acylamino-cephem-carboxylic acids of the general formula I and of their physiologically tolerated salts, wherein a 7-amino-$\Delta^3$-cephem-4-carboxylic acid of the general formula II

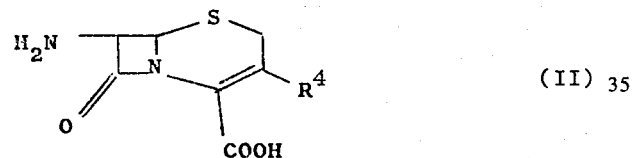

in which $R^4$ has the meaning given above, preferably in the form of a salt or ester, is reacted with a carboxylic acid of the general formula III

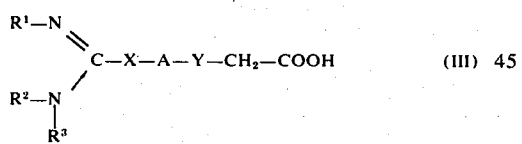

in which $R^1$, $R^2$, $R^3$, X, A and Y have the meanings given above, in particular in the form of a derivative which is reactive towards an amino group, or of a salt of such a compound. The carboxyl group which may be protected is then freed and, if desired, the compound obtained is converted into a physiologically tolerated salt.

If $R^1$, $R^2$ and $R^3$ stand for an alkyl group, there may be used in this respect straight chain or branched alkyl groups of 1 to 5 carbom atoms, the sum of the carbon atoms in the groups $R^1$, $R^2$ and $R^3$ being not greater than 6.

$R^4$ may be, for example methyl, ethyl, n-propyl, iso-propyl, n-butyl, isobutyl, pentyl, cyclopropyl, cyclobutyl, cyclopentyl, cyclohexyl, cycloheptyl, tetrahydrofuranyl or tetrahydrothienyl.

The alkylene groups which may be formed from the groups $R^1$ and $R^2$ may be those which contain 2 to 4 carbon atoms. As substituents of the alkylene group, there may be mentioned, for example low molecular weight alkyl groups of 1 to 4 carbon atoms which themselves may also form a ring that may be interrupted by a hetero-atom, preferably an oxygen atom. The alkyl substituents of the alkylene group which are not closed to a ring may also contain a hetero-atom, preferably an oxygen atom.

A stands in particular for the 1,4-phenylene or 2,5-thienylene group and these groups may also be substituted, for example by low molecular weight (1 to 4 carbon atoms) alkyl, alkoxy or halogen, preferably chlorine.

The following compounds of the formula III may be used, for example, as starting compounds in the process of the invention:

4-amidino-phenylacetic acid,
4-N-methyl-amidino-phenylacetic acid,
4-N,N-dimethyl-amidino-phenylacetic acid,
4-N,N'-dimethyl-amidino-phenylacetic acid,
4-N,N,N'-trimethyl-amidino-phenylacetic acid,
4-N-ethyl-amidino-phenylacetic acid,
4-N,N'-dipropyl-amidino-phenylacetic acid,
4-N-i-pentyl-amidino-phenylacetic acid,
4-N,N-dimethyl-N'-ethylamidino-phenylacetic acid,
4-(2-imidazolinyl)-phenylacetic acid,
4-(1,4,5,6-tetrahydro-2-pyrimidyl)-phenylacetic acid,
4-(1-methyl-1,4,5,6-tetrahydro-2-pyrimidyl)-phenylacetic acid,
4-[5,5-bis(2-methoxy-ethyl)-1,4,5,6-tetrahydro-2-pyrimidyl]-phenylacetic acid,
4-(1,5-dimethyl-2-imidazolinyl)-phenylacetic acid,
4-(1-methyl-5-butyl-2-imidazolinyl)-phenylacetic acid,
4-(5,5-dimethyl-1,4,5,6-tetrahydro-2-pyrimidyl)-phenylacetic acid,
4-(1,4,6,7,8,9-hexahydroxy-5H-cyclopentenyl[d-]pyrimidyl-2)-phenylacetic acid,
4-(9-oxa-2,4-diazospiro[5,5]-undec-2-ene-3-yl)-phenylacetic acid,
4-(2,4-diaza-spiro[5,5]undec-2-ene-yl)-phenylacetic acid,
4-(2,4-diaza-spiro[5,4]-dec-2-ene-3-yl)-phenylacetic acid,
4-N,N'-tetramethylene-amidino-phenylacetic acid,
3-amidino-phenylacetic acid,
4-amidino-2-methyl-phenylacetic acid,
4-amidino-2-methoxy-phenylacetic acid,
4-amidino-2-butoxy-phenylactic acid,
4-amidino-2-chloro-phenylacetic acid, and the corresponding phenoxy-, thienyl- or thienyloxy-acetic acids or the corresponding acids of the formula III in which X stands for NH.

As compounds of the formula II, there may be used, for example the following compounds:

3-methyl-7-amino-$\Delta^3$-cephem-4-carboxylic acid,
3-ethyl-7-amino-$\Delta^3$-cephem-4-carboxylic acid,
3-isopropyl-7-amino-$\Delta^3$-cephem-4-carboxylic acid,
3-n-propyl-7-amino-$\Delta^3$-cephem-4-carboxylic acid,
3-cyclopentyl-7-amino-$\Delta^3$-cephem-4-carboxylic acid.

The carboxylic acids of the general formula III, in which X represents a single bond, are prepared in known manner, for example from 4-cyano-phenyl-, 4-cyano-phenoxy- or 5-cyanothienyl- or 5-cyanothienyloxy-acetic acid esters. After conversion of the nitrilo group into an imino ether, the resulting compound is reacted with ammonia or an amine or diamine to give the amidine and, finally, the carboxylic acid ester group or an acid amide group resulting from it is hydrolyzed.

The carboxylic acid of the general formula III in which X stands for NH is prepared in known manner from the corresponding aminocarboxylic acid or aminocarboxylic acid derivatives by reacting the amino group of these compounds with cyanamides, carbodiimides, thioureas, S-alkyl-isothioureas, O-alkyl-isoureas or similar substances which may be substituted (Houben-Weyl 8, 180 – 195). On the other hand, it is also possible to react the amino group of the above-specified amino-carboxylic acid derivatives in known manner (Houben-Weyl 9, 887) to yield thio-ureas or S-alkyl-isothioureas and then to react the latter with amines to obtain the carboxylic acids of the general formula II in which X stands for NH.

The 7-amino-$\Delta^3$-cephem-4-carboxylic acids of the formula II used according to the invention as starting materials can be prepared in a manner known from literature or according to French Patent application Nos. 71/47761 or 72/31699.

The novel acyl derivatives of the 7-amino-$\Delta^3$-cephem-4-carboxylic acid of the formula II are obtained in a particularly advantageous manner by reacting the 7-amino-$\Delta^3$-cephem-4-carboxylic acid of the formula II in the form of its alkali metal salt or tertiary amine salt, for example the sodium, potassium or triethylamine salt, with a reactive derivative of a carboxylic acid of the general formula III in an as far as possible neutral pH-range, preferably in the pH-range of from 6 to 9.

The salts of the 7-amino-$\Delta^3$-cephem-4-carboxylic acid of the formula II may be used directly or they may prepared in the solution used for the reaction from 7-amino-$\Delta^3$-cephem-4-carboxylic acid of the formula II and, for example, sodium bicarbonate, di-sodium-hydrogen-phosphate or triethylamine.

The 7-amino-$\Delta^3$-cephem-4-carboxylic acid of the formula II may also be used in the form of its derivatives such as, in particular, its esters; in this case those esters are preferred which can be cleaned under relatively mild conditions, for example by hydrogenolysis or by hydrolysis, for example with trifluoroacetic acid, for example the benzhydryl ester, benzyl ester, 4-methoxybenzyl ester, 4-nitro-phenyl ester, tert. butyl ester or trichloroethyl ester.

In some cases, the reactive derivatives may not only be used in the form of a hydrochloride, but also in the form of other salts obtained in the process of preparation.

In general, the reaction according to the invention is carried out in water. However, it is also possible to operate in the presence of solvents which are miscible with water, for example acetone, dimethylformamide, dimethylacetamide, dioxane or tetrahydrofurane.

For the acylation of the 7-amino-$\Delta^3$-cephem-4-carboxylic acid of the formula II according to the invention, in particular the acid chlorides have proved to be good as reactive derivatives of the carboxylic acids of the general formula III. They can be obtained in known manner from the carboxylic acids by the action of thionyl chloride in an inert solvent, for example an aromatic hydro-carbon. In such a case they are obtained in the form of hydrochlorides which can directly be used for further reaction. Besides the acid chlorides, also other reactive derivatives of the carboxylic acids of the formula III may be used, for example acid bromides, activated esters such as the p-nitrophenyl-ester, p-nitrophenyl-thio-ester or cyanomethyl ester, acid azides or symmetric or mixed anhydrides. Reactive addition compounds of the carboxylic acids of the general formula III and, for example, carbodiimides that act as condensation agents may likewise be used, the 7-amino-$\Delta^3$-cephem-4-carboxylic acid of the formula II being advantageously used with a protected carboxyl group, for example in the form of a salt or of an ester. The reactive derivatives may be used not only in the form of the hydrochloride, but also in the form of other salts obtained during the preparation.

The acylation of the 7-amino-$\Delta^3$-cephem-4-carboxylic acid of the formula II is advantageously carried out by adding equi-molar amounts or a slight excess amount of a compound of the formula III in a form of a reactive derivative to the solution of a salt of the 7-amino-$\Delta^3$-cephem-4-carboxylic acid of the formula II in water or in a mixture of water and a solvent which is miscible with water.

It has been found to be particularly advantageous to introduce the hydrochloride of the acid chloride in solid form. In order to bind the hydrogen chloride, the solution is previously combined with two equivalents of a base, for example sodium bicarbonate or triethylamine. The reaction is carried out at room temperature or slightly reduced temperatures, preferably between $-5°$ and $+5°$ C. the pH-value which is at first weakly alkaline falls during the reaction to about 7.

The basic cephem-carboxylic acids of the general formula I are obtained in the form of inner salts and crystallize in most cases and can then be isolated by filtration with suction. In some other cases, it is necessary to precipitate them with the aid of non-solvents, for example acetone, and for purification they must be recrystallized from suitable solvent mixtures or again dissolved and recrystallized.

The novel acylamino-cephem-carboxylic acids of the general formula I contain in their molecule an amidino or guanidino group which may be substituted and have, therefore, an amphoteric character. They form inner salts and are generally well soluble in water with a pH-value of about 5.

The products of the invention may be used as such, in the form of their physiologically tolerated salts or also in the form of the above-described crude products. As substances which may be used for the formation of physiologically tolerated salts, there may be mentioned, for example hydrochloric acid, hydrobromic acid, amidosulfonic acid, citric acid, acetic acid, and suitable bases such as sodium hydroxide, ammonia or ethanolamine. The salt formation is effected, for example, by mixing equivalent amounts in solution and concentrating by evaporation.

The novel acylamino-cephem-carboxylic acids have outstanding anti-bacterial properties. Their action against gram-positive germs can be compared with that of penicillins. In addition, they have the advantage of having a good activity against penicillinase-forming staphylococci.

Minimum inhibition concentration in γ/ml.
Germ: Staph. aur. 285

| Substance | | MIC |
|---|---|---|
| Penicillin-G-NA | | 125 |
| Penicillin-V-K | | 125 |
| Ampicillin | | 100 |
| Example | 1 | 6.25 |
| '' | 2 | 25 |
| '' | 3 | 12.5 |
| '' | 4 | 6.25 |
| '' | 5 | 12.5 |
| '' | 6 | 1.25 |
| '' | 7 | 25 |
| '' | 8 | 6.25 |
| '' | 11 | 12.5 |
| '' | 12 | 12.5 |
| '' | 13 | 3.1 |
| '' | 14 | 12.5 |
| '' | 15 | 3.1 |
| '' | 16 | 6.25 |
| '' | 17 | 6.25 |
| '' | 18 | 12.5 |

The novel acylamino-cephem-carboxylic acids have a considerably higher stability, in particular towards acids, than commercially available penicillins.

T = 36°C    pH = 1.7    Time 24 hours
Concentration = 0.05% in 0.02-N aqueous hydrochloric acid

| Substance | | Destroyed proportion in % |
|---|---|---|
| Penicillin-G-Na | | 100 % |
| Penicillin-V-K | | 95 % |
| Ampicillin | | 72 % |
| Example | 1 | 0 % |
| '' | 2 | 5 % |
| '' | 3 | 6 % |
| '' | 4 | 0 % |
| '' | 5 | 0 % |
| '' | 6 | 5 % |
| '' | 7 | 10 % |
| '' | 8 | 3 % |

When compared with the cephalosporins available in commerce, the novel acylamino-cephem-carboxylic acids show, with similar action against gram-positive germs, particular pharmaco-kinetic properties: upon intravenous injection of the substances of the invention into dogs, higher and longer lasting substance levels in the blood were observed:
Dose: 10 mg/kg
Test germ: Bac. subtilis ATCC 6633
Test material: serum
FSC: Fictitious Starting Concentration
$T^{50}$: Average time of level maintenance (hours)

| Preparation | FSC | ½h | 1h | 2h | 3h | 4h | 5h | 6h | $T^{50}$ |
|---|---|---|---|---|---|---|---|---|---|
| Cephalotin | 14.5 | 10.4 | 7.4 | 3.7 | 1.9 | 0 | 0 | 0 | 1.0 |
| Example 4 | 35.2 | 30.2 | 23.3 | 20.5 | 7.3 | 6.5 | 5.7 | 3.4 | 1.8 |
| Example 5 | 25.5 | 21.3 | 17.8 | 12.5 | 8.7 | 6.1 | 4.3 | 3.0 | 1.9 |

The values indicated in the above Tables show that the novel acylamino-cephem-carboxylic acids are equivalent to the antibiotics available in commerce and that in special cases they are even superior to them.

Thus, the products of the invention are valuable therapeutic agents which can be used very successfully for the treatment of bacterial infections. They can be used as such or together with the usual pharmaceutical excipients and adjuvants, for example tragacanth, lactose, talc, agar-agar, etc. in the form of galenic preparations, for example tablets, dragees, capsules, or in the form of solutions or suspensions, which contain the active substance in a quantity of from about 50 to 1000 mg, preferably 100 – 500 mg. For parenteral administration, preferably suspensions or solutions in water are used. Other physiologically tolerated organic solvents, for example ethanol, polyglycols, or solubilizers may also be added. It is also possible to combine them with other active substances. Thus, the compounds of the invention may be applied simultaneously, for example, with other antibiotic agents, for example those of the series of the penicillins, cephalosporins, or with compounds which have a favorable influence on the symptomatology of bacterial infections, for example antipyretic, analgesic or antiphlogistic agents.

The following Examples illustrate the invention. The novel acylamino-cephem-carboxylic acids described in these Examples were characterized by their thin layer chromatogram. As the layer, silica gel (Merck) was used and, a 0.1-N aqueous ammonium acetate solution was used as the eluant. The plates were developed by the action of iodine vapor. The products were free from unreacted 7-amino-$\Delta^3$-cephem-4-carboxylic acid used in each respective case. In the infrared spectrum, the compounds showed the absorption band at 1755 cm$^{-1}$ which is characteristic for the β-lactam ring.

EXAMPLE 1

3-Methyl-7-(4-amidino-phenylacetamino)-$\Delta^3$-cephem-4-carboxylic acid a. 5.35 g of 4-amidino-phenylacetic acid (melting point 295° – 297° C, decomposition) were suspended in 45 ml of anhydrous benzene. Two drops of dimethylformamide and 17.9 g of thionylchloride were added and the whole was heated for 1½ hours under reflux. After having cooled, the solid product was filtered off with suction, washed with anhydrous benzene and dried under reduced pressure. 6.9 g of 4-amidino-phenylacetic acid chloride-hydrochloride, melting point 174° – 177° C (decomposition), were obtained.

b. 3.64 g of 4-amidino-phenylacetic acid chloride-hydrochloride were added within about 10 minutes to a solution which had been cooled to about 0° C of 2.78 g of 3-methyl-7-amino-$\Delta^3$-cephem-4-carboxylic acid and 3.36 g of sodium bicarbonate in 50 ml of water and 6 ml of acetone. The reaction mixture foamed up and a colorless crystalline precipitate was formed which was filtered off with suction at 0° C after 1 hour, washed with cold water, acetone and ether and dried in air.

5.5 g of 3-methyl-7-(4-amidino-phenylacetamino)-$\Delta^3$-cephem-4-carboxylic acid, melting point 230° – 233° C (decomposition), were obtained.

EXAMPLE 2

3-Methyl-7-(4-amidino-phenoxyacetamino)-Δ³-cephem-4-carboxylic acid a. 9.7 g of 4-amidino-phenoxyacetic acid (melting point 324° – 326° C) were suspended in 50 ml of anhydrous benzene, 29.7 g of thionyl chloride were added and the whole was heated for 1 hour on the steam bath under reflux. After having allowed the reaction mixture to cool, the solid product was filtered off with suction. 11.4 g of 4-amidino-phenoxy-acetyl chloride-hydrochloride were obtained which had a decomposition point of 142° – 143° C.

b. From this compound, there was obtained in a manner analogous to that described in Example 1, the 3-methyl-7-(4-amidino-phenoxyacetamino)-Δ³-cephem-4-carboxylic acid in the form of colorless crystals which decompose at temperatures starting from 240° C onwards.

EXAMPLE 3

3-Methyl-7-(5-amidino-2-thienylacetamino)-Δ³-cephem-4-carboxylic acid

In a manner analogous to that described in Example 1, there was obtained from 5-amidino-thienyl-2-acetic acid and 3-methyl-7-amino-Δ³-cephem-4-carboxylic acid, the 3-methyl-7-(5-amidino-2-thienylacetamino)-Δ³-cephem-4-carboxylic acid in the form of weakly yellowish crystals which were found to melt at about 225° C with decomposition.

EXAMPLE 4

3-Methyl-7-[4-(2-imidazolinyl)-phenylacetamino]-Δ³-cephem-4-carboxylic acid

Ia. 10 g of 4-(2-imidazolinyl)-phenylacetic acid (melting point 196° – 197° C) were stirred with 150 ml of anhydrous benzene and 90 ml of thionyl chloride for 5 hours at 50° – 60° C. After cooling, the crystalline product was filtered off with suction, washed with anhydrous benzene and dried under reduced pressure. 11 g of 4-(2-imidazolinyl)-phenylacetic acid chloride-hydrochloride were obtained.

b. 1.81 g of 4-(2-imidazolinyl)-phenylacetic acid chloride-hydrochloride were added within about 10 minutes to a solution which had been cooled to about 0° C of 1.29 g of 3-methyl-7-amino-Δ³-cephem-4-carboxylic acid and 1.68 g of sodium bicarbonate in 27 ml of water and 3 ml of acetone. After 1 hour, the mixture was filtered and the pH-value thereof was adjusted to 1.7 by means of 6N-hydrochloric acid, whereupon a jelly-like product formed. The latter was filtered off with suction, washed with acetone, dissolved in 3 ml of water and neutralized with sodium acetate. The product that had then crystallized was filtered off with suction and washed with ice-water, acetone and ether. 1.6 g of 3-methyl-7-[4-(2-imidazolinyl)-phenylacetamino]-Δ³-cephem-4-carboxylic acid melting at 235° – 237° C were obtained. The product contained one half mole of acetone. The infrared and NMR spectra correspond to the assumed structure.

IIa. 1.24 g of N,N'-dicyclohexyl-carbodiimide in 10 ml of DMF were added dropwise to a solution that had been cooled to 0° C of 1.9 g of 3-methyl-7-amino-Δ³-cephem-4-carboxylic acid-benzhydryl ester (melting point 153° – 154° C) and 1.2 g of 4-(2-imidazolinyl)-phenylacetic acid hydrochloride (melting point 223° – 224° C) in 50 ml of DMF. After having allowed the whole to stand for 1 hour at 0° C and overnight at 20° C, the mixture was filtered and the product was precipitated from the filtrate with the aid of ether; it was obtained in the form of an oil. This oil was crystallized with acetone and recrystallized from ethanol.

In this manner, 3-methyl-7-[4-imidazolinyl)-phenylacetamino]-Δ³-4-carboxylic acid benzhydryl ester-hydrochloride in the form of colorless crystals which were found to melt at about 195° – 200° C with decomposition was obtained.

The infrared spectrum showed the characteristic bands to be expected:

β-Lactam: 1770, ester: 1715, and acyl: 1660 cm⁻¹.

b. The ester obtained according to Example 4 II(a) was suspended in 2.5 ml of benzene and 0.2 ml of anisole and the whole was treated for 15 minutes at room temperature with 0.3 ml of trifluoroacetic acid. The volatile components were distilled off under reduced pressure and the residue was washed with ethyl acetate. The residue was dissolved in 10 ml of water, the solution was filtered and the pH-value was adjusted to 7 by means of dilute ammonia. After the addition of a small amount of acetone and cooling, the 3-methyl-7-[4-(2-imidazolinyl)-phenylacetamino]-Δ³-cephem-4-carboxylic acid crystallized. It was filtered off with suction and washed with a mixture of acetone and water. The colorless crystals were found to melt at 235° C.

EXAMPLE 5

3-Methyl-7-[4-(1,4,5,6-tetrahydro-2-pyrimidyl)-phenylacetamino]-Δ³-cephem-4-carboxylic acid In a manner analogous to that described in Example 4, there was obtained from 4-(1,4,5,6)-tetrahydro-2-pyrimidyl-phenylacetic acid hydrochloride (melting point 256° – 257° C with decomposition) and 3-methyl-7-amino-Δ³-cephem-4-carboxylic acid, the 3-methyl-7-[4-(1,4,5,6-tetrahydro-2-pyrimidyl)-phenylacetamino]-Δ³-cephem-4-carboxylic acid melting at 243° – 244° C (decomposition).

The product was recrystallized from a mixture of water and acetone and contained then one half mole of acetone and one half of crystal water. The infrared and NMR spectrums corresponded with the expected structure.

EXAMPLE 6

3-Methyl-7-[4-(2-imidazolinyl)-phenoxyacetamino]-Δ³-cephem-4-carboxylic acid a. 25 ml of thionyl choride were added to a suspension of 4.4 g of 4(-2-imidazolinyl)-phenoxyacetic acid (melting point 278° – 280° C, decomposition) in 25 ml of anhydrous benzene and the whole was heated for 3 hours under reflux. After having allowed the reaction mixture to cool, the solid product was filtered off with suction and dried under reduced pressure. 4.9 g of 4-(2-imidazolinyl)-phenoxyacetyl chloride-hydrochloride were obtained; the compound was found to decompose at a temperatures from 195° C onwards.

b. 4.35 g of 4-(2-imidazolinyl)-phenoxyacetyl chloride-hydrochloride were added within about 10 minutes to a solution that had been cooled to about 0° C of 3.05 g of 3-methyl-7-amino-Δ³-cephem-4-carboxylic acid and 3.98 g of sodium bicarbonate in 65 ml of water and 7.5 ml of acetone. After one hour, the pH-value was adjusted to 4 by means of 2N-hydrochloric acid, the mixture was filtered, the solvent was distilled off under reduced pressure, the residue was dissolved in hot methanol, filtered and the product was precipitated with the aid of acetone. 2.9 g of 3-methyl-7-[4-(2-imidazolinyl)-phenoxyacetamino]-$\Delta^3$-cephem-4-carboxylic acid were obtained which were found to decompose at 202°–205° C ($R_f = 0.23$).

EXAMPLE 7

3-Methyl-7-[4-(1,4,5,6-tetrahydro-2-pyrimidyl)-phenoxyacetamino]-$\Delta^3$-cephem-4-carboxylic acid In a manner analogous to that described in Example 6, there was obtained from 4-(1,4,5,6-tetrahydro-2-pyrimidyl)-phenoxyacetic acid-hydrochloride (melting point 245° – 246° C) and 3-methyl-7-amino-$\Delta^3$-cephem-4-carboxylic acid, the 3-methyl-7-[4-(1,4,5,6-tetrahydro-2-pyrimidyl)-phenoxyacetamino]-$\Delta^3$-cephem-4-carboxylic acid in the form of an amorphous powder, which was uniform in thin layer chromatography ($R_f = 0.22$).

EXAMPLE 8

3-Methyl-7-(4-guanidino-phenylacetamino)-$\Delta^3$-cephem-4-carboxylic acid 4.7 g of 4-guanidino-phenylacetyl chloride-hydrochloride (melting point 126° – 128° C) were added within about 10 minutes to a solution that had been cooled to about 0° C. of 3.1 g of 3-methyl-7-amino-$\Delta^3$-cephem-4-carboxylic acid and 4.0 g of sodium bicarbonate in 52 ml of water and 19 ml of tetrahydrofurane. After 10 minutes at 0° C and 10 minutes at room temperature, the whole was filtered, the product was precipitated from the filtrate by means of acetone and recrystallized from a mixture of water and acetone. 3.1 g of 3-methyl-7-(4-guanidino-phenylacetamino)-$\Delta^3$-cephem-4-carboxylic acid melting at about 270° C (decomposition) were obtained.

EXAMPLE 9

3-Methyl-7-(4-N,N'-tetramethylene-amidino-phenylacetamino)-$\Delta^3$-cephem-4-carboxylic acid a. 1.24 g of N,N'-dicyclohexyl-carbodiimide in 10 ml of DMF were added dropwise to a solution that had been cooled to 0° C of 1.9 g of 3-methyl-7-amino-$\Delta^3$-cephem-4-carboxylic acid benzhydryl ester (melting pont 153° – 154° C) and 1.34 g of 4-N,N'-tetramethylene-amidino-phenylacetic acid hydrochloride (melting point 225° – 228° C with decomposition) in 50 ml of DMF. After having allowed the whole to stand for 1 hour at 0° C and overnight at about 20° C, it was filtered and from the filtrate the product was precipitated with the aid of ether, crystallized with a small amount of water and acetone and recrystallized from ethanol. In this manner, 3-methyl-7-(4-N,N'-tetramethylene-amidino-phenylacetamino)-$\Delta^3$-cephem-4-carboxylic acid ester hydrochloride was obtained in the form of colorless crystals which were formed to melt at about 175° C with decomposition.

The infrared spectrum showed the expected characteristic bands:

$\beta$-lactam: 1770, ester: 1715, acryl: 1630 cm$^{-1}$.

b. The ester obtained according to Example 9(a) was suspended in 5 ml of benzene and 0.5 ml of anisole and treated for 15 minutes at room temperature with 0.75 ml of trifluoroacetic acid. The volatile components were then removed by distillation under reduced pressure and the residue was washed with ethyl acetate. This residue was dissolved in 10 ml of water and 1 ml of acetone, the solution was filtered and the pH-value thereof was adjusted to 7 by means of dilute ammonia. After having added a small amount of acetone and having allowed the mixture to cool, the 3-methyl-7-(4-N,N'-tetramethylene-amidino-phenylacetamino)-$\Delta^3$-cephem-4-carboxylic acid crystallized. It was filtered off with suction and washed with a mixture of acetone and water. The colorless crystals were found to melt at about 212° C with decomposition.

EXAMPLE 10

3-Methyl-7-[4-(N-methyl-1,4,5,6-tetrahydro-2-pyrimidyl)-phenoxyacetamino]-$\Delta^3$-cephem-4-carboxylic acid.

In a manner analogous to that described in Example 6, there was obtained from 4-(N-methyl-1,4,5,6-tetrahydro-2-pyrimidyl)-phenoxyacetic acid and 3-methyl-7-amino-$\Delta^3$-cephem-4-carboxylic acid, the 3-methyl-7-[4-N-methyl-1,4,5,6-tetrahydro-2-pyrimidyl)-phenoxyacetamino]-$\Delta^3$-cephem-4-carboxylic acid in the form of colorless crystals that were found to melt at about 250° C with decomposition ($R_f = 0.34$).

EXAMPLE 11

3-Ethyl-7-(4-guanidino-phenylacetamido)-$\Delta^3$-cephem-4-carboxylic acid 0.59 g of 4-guanidino-phenylacetyl chloride-hydrochloride were added within about 10 minutes to a solution that had been cooled to about 0° C of 0.46 g of 3-ethyl-7-amino-$\Delta^3$-cephem-4-carboxylic acid and 0.42 g of sodium bicarbonate in 8 ml of water and 0.8 ml of acetone. With foaming, a fine precipitate was formed which was allowed to stand for 1 hour at 0° C, filtered off with suction, washed with a small amount of cold water, acetone and ether and dried in air. 0.50 g of 3-ethyl-7-(4-guanidino-phenylacetamido)-$\Delta^3$-cephem-4-carboxylic acid decomposing at temperatures from 250° C onwards were obtained.

EXAMPLE 12

3-Ethyl-7-[4-(2-imidazolinyl)-phenylacetamido]-$\Delta^3$-cephem-4-carboxylic acid In a manner analogous to that described in Example 11, there were obtained from 0.62 g of 4-(2-imidazolinyl)-phenyl-acetyl chloride-hydrochloride and 0.46 g of 3-ethyl-7-amino-$\Delta^3$-cephem-4-carboxylic acid, 0.54 g of 3-ethyl-7-[4-(2-imidazolinyl)-phenylacetamido]-$\Delta^3$-cephem-4-carboxylic acid, which was found to melt at about 195° C with decomposition.

EXAMPLE 13

3-Ethyl-7-[4-(N-methyl-1,4,5,6-tetrahydro-2-pyrimidyl)-phenoxy-acetamido]-$\Delta^3$-cephem-4-carboxylic acid In a manner analogous to that described in Example 11, there were obtained from 0.73 g of 4-(N-methyl-1,4,5,6-tetrahydro-2-pyrimidyl)-phenoxyacetyl chloride-hydrochloride and 0.46 g of 3-ethyl-7-amino-$\Delta^3$-cephem-4-carboxylic acid, 0.87 g of 3-ethyl-7-[4-(N-methyl-1,4,5,6-tetra-hydro-2-pyrimidyl)-phenoxyacetamido[-$\Delta^3$-cephem-4-carboxylic acid was obtained which was found to melt at 235° – 237° C with decomposition.

EXAMPLE 14

3-Isopropyl-7-[4-(2-imidazolinyl)-phenylacetamido]-Δ³-cephem-4-carboxylic acid

In a manner analogous to that described in Example 11, there were obtained from 0.13 g of 4-(2-imidazolinyl)-phenylacetylchloride, hydrochloride and 0.09 g of 3-isopropyl-7-amino-Δ³-cephem-4-carboxylic acid, 0.15 g of 3-isopropyl-7-[4-(2-imidazolinyl)-phenylacetamido]-Δ³-cephem-4-carboxylic acid which was found to melt at 201° – 203° C with decomposition.

EXAMPLE 15

3-Ethyl-7-(4-amidino-phenylacetamido)-Δ³-cephem-4-carboxylic acid

In a manner analogous to that described in Example 11, there were obtained from 0.395 g of 4-amidino-phenylacetyl-chloride-hydrochloride and 0.385 g of 3-ethyl-7-amino-Δ³-cephem-4-carboxylic acid, 0.60 g of 3-ethyl-7-(4-amidino-phenylacetamido)-Δ³-cephem-4-carboxylic acid which was found to melt at 224° – 226° C with decomposition.

EXAMPLE 16

3-Ethyl-7-(4-amidino-phenoxyacetamido)-Δ³-cephem-4-carboxylic acid

In a manner analogous to that described in Example 11, there were obtained from 0.50 g of 4-amidino-phenoxyacetyl-chloride-hydrochloride and 0.455 g of 3-ethyl-7-amino-Δ³-cephem-4-carboxylic acid, 0.610 g of 3-ethyl-7-(4-amidino-phenoxy-acetamido)-Δ³-cephem-4-carboxylic acid which was found to melt at 239° – 240° C with decomposition.

EXAMPLE 17

3-Isopropyl-7-(4-amidino-phenylacetamido)-Δ³-cephem-4-carboxylic acid

In a manner analogous to that described in Example 11, there were obtained from 0.40 g of 4-amidino-phenylacetyl-chloride-hydrochloride and 0.36 g of 3-isopropyl-7-amino-Δ³-cephem-4-carboxylic acid, 0.57 g of 3-isopropyl-7-(4-amidino-phenylacetamido)-Δ³-cephem-4-carboxylic acid which was found to melt at 233° – 235° C with decomposition.

EXAMPLE 18

3-Isopropyl-7-(4-amidino-phenoxyacetamido)-Δ³-cephem-4-carboxylic acid

In a manner analogous to that described in Example 11, there were obtained from 4-amidino-phenoxyacetyl-chloride-hydrochloride and 0.36 g of 3-isopropyl-7-(4-amidino-phenoxyacetamido)-Δ³-cephem-4-carboxylic acid which was found to melt at 247° – 249° C with decomposition.

We claim:
1. An acylamino-cephem-carboxylic acid of the formula

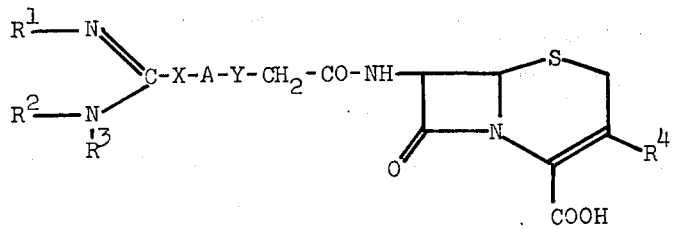

and physiologically tolerated salts thereof, wherein $R^1$, $R^2$, and $R^3$, taken alone, are hydrogen or lower alkyl; $R^1$ and $R^2$, taken together, are alkylene having 2 to 4 carbon atoms, alkylene having from 2 to 4 carbon atoms substituted with lower alkyl or lower alkoxy alkyl, or alkylene having from 2 to 4 carbon atoms substituted on one carbon atom thereof with lower alkylene or lower oxa-alkylene to form a spiro-connected 5- or 6-membered carbocycle or oxygen heterocycle therewith; $R^4$ is linear or branched alkyl having 1 to 5 carbon atoms, cycloalkyl having 3 to 7 carbon atoms, tetrahydrofuranyl, or tetrahydrothienyl; X is NH or a single bond; A is phenylene, thienylene, or phenylene or thienylene substituted by lower alkyl, lower alkoxy, or chlorine; and Y is oxygen or a single bond.

2. 3-Methyl-7-(4-amidino-phenylacetamino)-Δ³-cephem-4-carboxylic acid.

3. 3-Methyl-7-(4-amidino-phenoxyacetamino)-Δ³-cephem-4-carboxylic acid.

4. 3-Methyl-7-(5-amidino-2-thienylacetamino)-Δ³-cephem-4-carboxylic acid.

5. 3-Methyl-7-[4-(2-imidazolinyl)-phenylacetamino]-Δ³-cephem-4-carboxylic acid.

6. 3-Methyl-7-[4-(1,4,5,6-tetrahydro-2-pyrimidyl)-phenylacetamino]-Δ³-cephem-4-carboxylic acid.

7. 3-Methyl-7-[4-(2-imidazolinyl)-phenoxyacetamino]-Δ³-cephem-4-carboxylic acid.

8. 3-Methyl-7-[4-(1,4,5,6-tetrahydro-2-pyrimidyl)-phenoxyacetamino]-Δ³-cephem-4-carboxylic acid.

9. 3-Methyl-7-(4-guanidino-phenylacetamino)-Δ³-cephem-4-carboxylic acid.

10. 3-Methyl-7-(4-N,N'-tetramethylene-amidino-phenylacetamino)-Δ³-cephem-4-carboxylic acid.

11. 3-Methyl-7-[4-(N-methyl-1,4,5,6-tetrahydro-2-pyrimidyl)-phenoxyacetamino]-Δ³-cephem-4-carboxylic acid.

12. 3-Ethyl-7-(4-guanidino-phenylacetamido)-Δ³-cephem-4-carboxylic acid.

13. 3-Ethyl-7-[4-(2-imidazolinyl)-phenylacetamido]-Δ³-cephem-4-carboxylic acid.

14. 3-Ethyl-7-[4-(N-methyl-1,4,5,6-tetrahydro-2-pyrimidyl)-phenoxyacetamido]-Δ³-cephem-4-carboxylic acid.

15. 3-Isopropyl-7-[4-(2-imidazolinyl)-phenylacetamido]-Δ³-cephem-4-carboxylic acid.

16. 3-Ethyl-7-(4-amidino-phenylacetamido)-Δ³-cephem-4-carboxylic acid.

17. 3-Ethyl-7-(4-amidino-phenoxyacetamido)-Δ³-cephem-4-carboxylic acid.

18. 3-Isopropyl-7-(4-amidino-phenylacetamido)-Δ³-cephem-4-carboxylic acid.

19. 3-Isopropyl-7-(4-amidino-phenoxyacetamido)-Δ³-cephem-4-carboxylic acid.

* * * * *